US007955682B2

(12) United States Patent
Gore

(10) Patent No.: US 7,955,682 B2
(45) Date of Patent: Jun. 7, 2011

(54) PHOTOCHEMICAL AND PHOTOTHERMAL REARRANGEMENTS FOR OPTICAL DATA AND IMAGE RECORDING

(75) Inventor: Makarand P. Gore, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 675 days.

(21) Appl. No.: 12/023,619

(22) Filed: Jan. 31, 2008

(65) Prior Publication Data

US 2008/0124661 A1 May 29, 2008

Related U.S. Application Data

(63) Continuation-in-part of application No. 11/410,728, filed on Apr. 25, 2006.

(51) Int. Cl.
*B32B 3/02* (2006.01)

(52) U.S. Cl. ........ 428/64.8; 428/913; 503/201; 503/216

(58) Field of Classification Search ................ 428/64.4, 428/64.8, 195.1; 427/150, 151; 503/201, 503/216

See application file for complete search history.

(56) References Cited

U.S. PATENT DOCUMENTS

| | | | | |
|---|---|---|---|---|
| 2,663,758 | A * | 12/1953 | Shepard | 382/201 |
| 3,098,099 | A * | 7/1963 | Conte, Jr. et al. | 568/310 |
| 4,054,718 | A * | 10/1977 | Garner et al. | 503/217 |
| 4,524,373 | A * | 6/1985 | Kondo et al. | 503/221 |
| 5,501,938 | A | 3/1996 | Ellis et al. | |
| 5,510,227 | A | 4/1996 | DoMinh et al. | |
| 5,559,075 | A | 9/1996 | Leenders et al. | |
| 6,537,720 | B1 | 3/2003 | Foley et al. | |
| 7,018,952 | B2 | 3/2006 | Tsukida et al. | |
| 2001/0025326 | A1* | 9/2001 | Kizaki | 710/100 |
| 2002/0020832 | A1 | 2/2002 | Oka et al. | |
| 2003/0108708 | A1* | 6/2003 | Anderson et al. | 428/64.4 |
| 2004/0033433 | A1 | 2/2004 | Foley et al. | |
| 2004/0122782 | A1 | 6/2004 | Audousset et al. | |
| 2005/0208290 | A1 | 9/2005 | Patel | |
| 2005/0255999 | A1 | 11/2005 | Fisher | |
| 2006/0257780 | A1 | 11/2006 | Zwadlo | |
| 2006/0258776 | A1 | 11/2006 | Aoai | |
| 2007/0248781 | A1 | 10/2007 | Gore | |

OTHER PUBLICATIONS

PCT International Search Report, Application No. PCT/US2009/032340, Filed Jan. 29, 2009. Report issued Jul. 31, 2009.

* cited by examiner

*Primary Examiner* — Mark Ruthkosky
*Assistant Examiner* — Gerard T Higgins

(57) ABSTRACT

A system for recording and/or transmitting optical data or visual images includes an optical data or visual image recording medium and a light and/or heat source. The medium includes a markable coating established on a substrate. The markable coating includes a leuco dye and a developer precursor including a compound that undergoes rearrangement in response to a stimulus, thereby forming a developer that reacts with the leuco dye. The light/heat source is positioned so as to illuminate and/or heat the medium in a predetermined manner to i) cause photochemical and/or photothermal rearrangement of the developer precursor to form the developer which reacts with the leuco dye to form an optically detectable mark, or ii) cause at least one optically detectable mark previously formed on the markable coating to produce at least one readable pattern.

7 Claims, 2 Drawing Sheets

PHOTOCHEMICAL AND PHOTOTHERMAL REARRANGEMENTS FOR OPTICAL DATA AND IMAGE RECORDING

CROSS-REFERENCE TO RELATED APPLICATIONS

This application is a continuation-in-part of U.S. patent application Ser. No. 11/410,728, filed on Apr. 25, 2006 and entitled "Optical Recording Medium," which is herein incorporated by reference in its entirety.

BACKGROUND

The present disclosure relates generally to apparatuses, methods and materials that produce color change upon stimulation with radiation and are used in optical data recording media, visual imaging media and devices.

Materials that produce color change upon stimulation with radiation are used in optical recording and imaging media and devices. Further, widespread adoption of and rapid advances in technologies relating to optical recording and imaging media have created a desire for greatly increased data storage capacity in such media. Thus, optical storage technology has evolved from the compact disc (CD) and laser disc (LD) to far denser data types, such as digital versatile disc (DVD) and blue laser formats such as BLU-RAY and high-density DVD (HD-DVD). "BLU-RAY" and the BLU-RAY Disc logo mark are trademarks of the BLU-RAY Disc Founders, which consists of 13 companies in Japan, Korea, Europe, and the U.S.

In each case, the optical recording medium includes a substrate, typically a disc, on which is deposited a layer on which a mark may be created. In some media, the mark is a "pit," or indentation in the surface of the layer, and the spaces between pits are called "lands." A marked disc can be read by directing a laser beam at the marked surface and recording changes in the reflected beam. An imaging medium consists of any surface coated with material activated by light.

BRIEF DESCRIPTION OF THE DRAWINGS

Features and advantages of embodiments of the present disclosure will become apparent by reference to the following detailed description and drawings, in which like reference numerals correspond to similar, though not identical, components. For the sake of brevity, reference numerals or features having a previously described function may or may not be described in connection with other drawings in which they appear.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "comprising, but not limited to . . . . "

Reference is made herein to BLU-RAY technologies. DVD specifications for BLU-RAY discs currently include the following: wavelength=405 nm; numerical aperture (NA)=0.85; disc diameter=12 cm; disc thickness=1.2 mm; and data capacity≧23.3/25/27 GB. BLU-RAY discs can currently be used to store 2 hours of high resolution video images or 13 hours of conventional video images. A blue-violet laser having a wavelength ranging from about 380 nm to about 420 nm, and particularly 405 nm is used as the light source for BLU-RAY discs. Another technology using blue light (380~420 nm radiation) is HD-DVD.

As used herein, the term "leuco dye" refers to a color-forming substance that is colorless or one color in a non-activated state and that produces or changes color in an activated state. As used herein, the terms "developer" and "activator" describe a substance that reacts with the dye and causes the dye to alter its chemical structure and change or acquire color.

The term "light" as used herein includes electromagnetic radiation of any wavelength or band and from any source.

DETAILED DESCRIPTION

Figure 1:
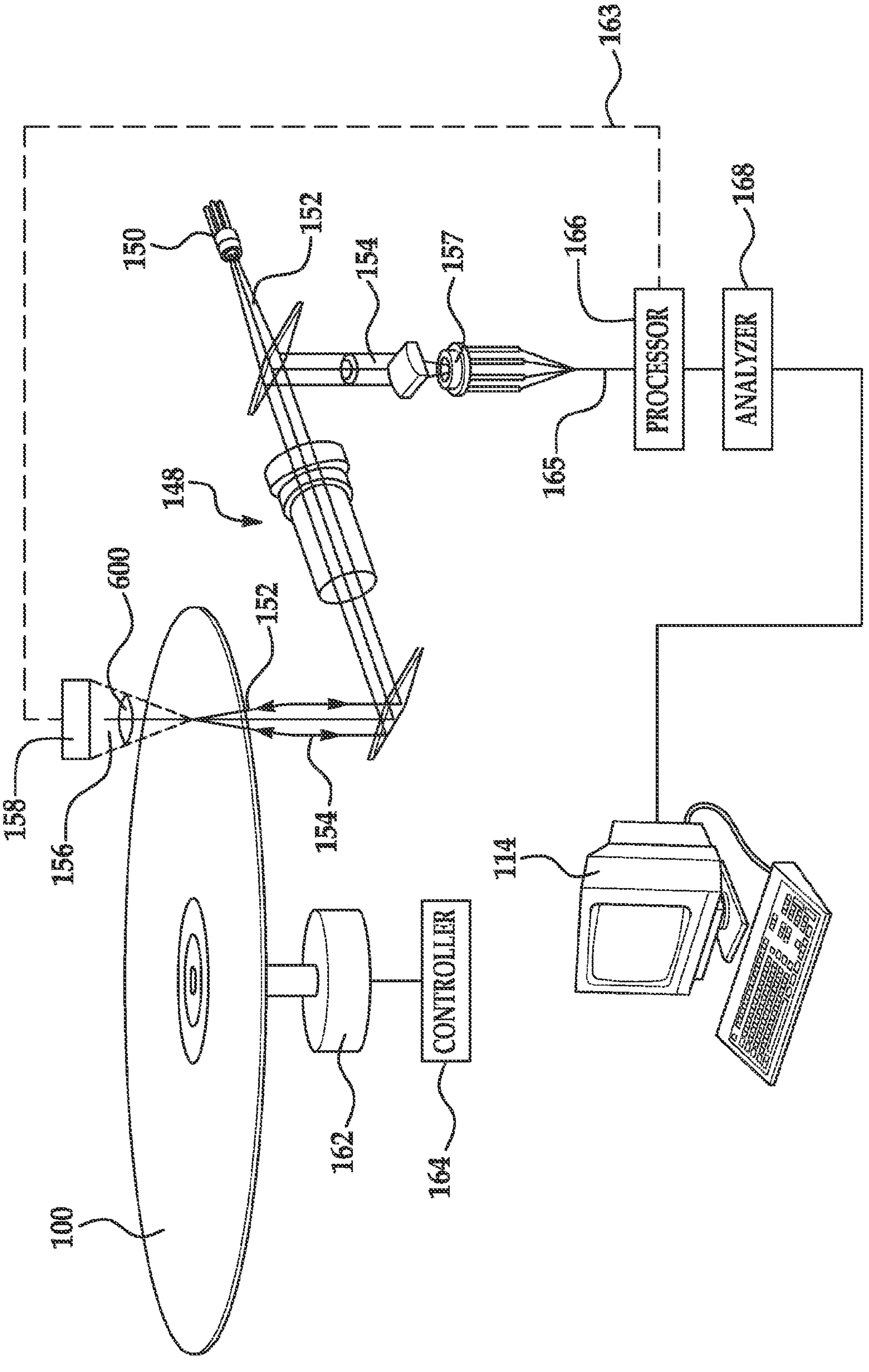
FIG. 1 is a semi-schematic perspective view and block diagram illustrating an embodiment of an optical disc recording system.

Referring to FIG. 1, there is shown a semi-schematic representation in perspective and block diagram illustrating optical components 148, a light source 150 that produces the incident energy beam 152, a return beam 154 which is detected by the pickup 157, and a transmitted beam 156. In the transmissive optical disc form, the transmitted beam 156 is detected by a top detector 158 via lens or optical system 600, and is also analyzed for the presence of signal agents. In the transmissive embodiment, a photo detector may be used as a top detector 158. It is to be understood that FIG. 2 shows an abbreviated block diagram of the read/write system 170 illustrating some of the same optical components shown in FIG. 1.

FIG. 1 also illustrates a drive motor 162 and a controller 164 for controlling the rotation of the optical disc/imaging medium 100. FIG. 1 further shows a processor 166 and analyzer 168 implemented in the alternative for processing the return beam 154 with a signal 165 from the pickup 157 to the processor 166, as well as processing a transmitted beam 156 from a signal 163 transmitted from the optical detector 158 and associated with the transmissive optical disc format. A display monitor 114 is also provided for displaying the results of the processing.

Figure 2:
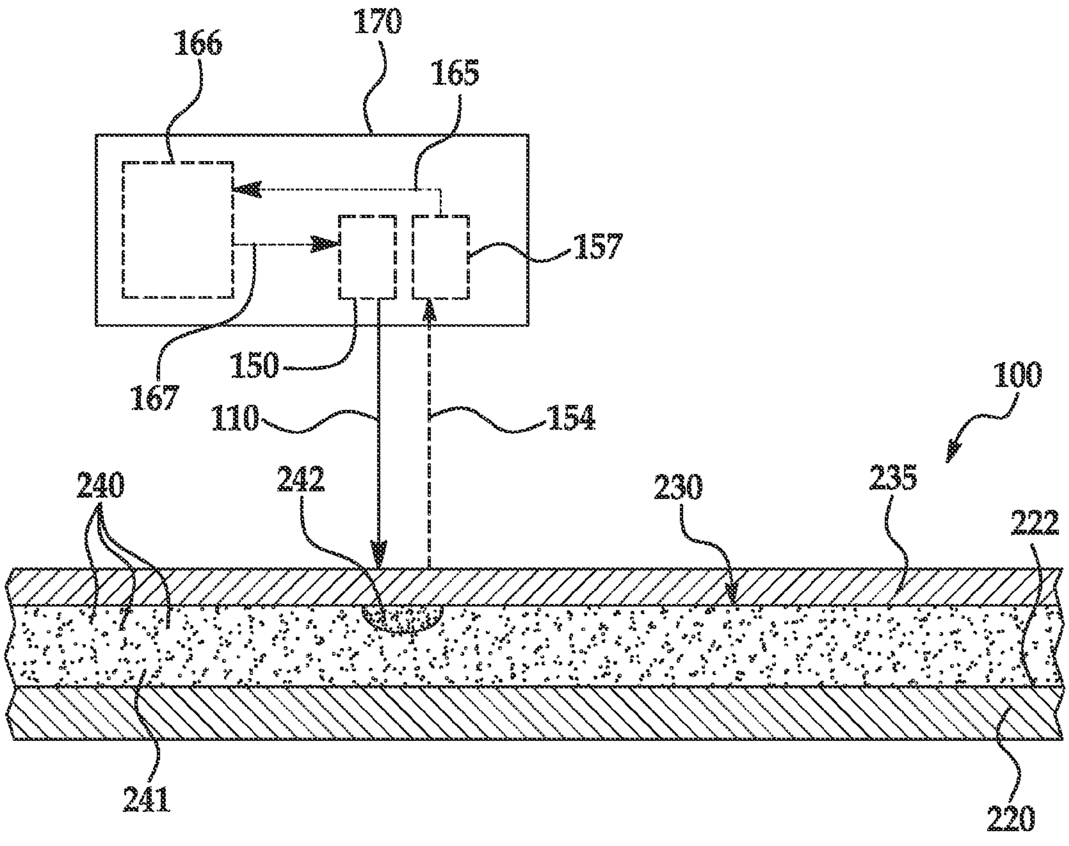
FIG. 2 is a schematic side elevation view of an embodiment of a recordable optical disc in conjunction with a partial block diagram of some of the elements of the system represented in FIG. 1.

Referring briefly to FIG. 2, there is shown (in a schematic partial block diagram) the read/write system 170 that applies an incident energy beam 152 onto the imaging medium 100.

Imaging medium 100 includes a substrate 220 and a marking layer 230 on a surface 222 of substrate 220. In the embodiment shown, imaging medium 100 further includes a protective layer 235, such as is generally known. As described in detail below, marking layer 230 preferably includes a color-forming agent 240 suspended or dissolved or finely dispersed in a matrix or binder 241. Marking layer 230 may include a polymeric matrix and may include an optional fixing agent (not shown).

Substrate 220 may be any substrate upon which it is desirable to make a mark, such as, by way of example, the polymeric substrate of a CD-R/RW/ROM, DVD±R/RW/ROM, HD-DVD or BLU-RAY disc. Substrate 220 may be paper (e.g., labels, tickets, receipts, or stationery), an overhead transparency, or another surface upon which it is desirable to provide marks. Marking layer 230 may be applied to substrate 220 via any acceptable method, such as, for example, rolling, spin-coating, spraying, lithography, screen printing or the like.

When it is desired to make a mark, marking energy 110 (incident energy beam 152 shown in FIG. 1) is directed in a desired manner at imaging medium 100. The form of the energy may vary depending, at least in part, upon the equipment available, ambient conditions, and desired result(s). Examples of energy (also referred to herein as radiation) that may be used include, but are not limited to, infra-red (IR) radiation, ultra-violet (UV) radiation, x-rays, or visible light. In these embodiments, imaging medium 100 is illuminated with light having the desired predetermined wavelength at the location where it is desirable to form a mark.

The marking layer 230 absorbs the energy, causing a photochemical or photothermal change in marking layer 230, resulting in an optically detectable mark 242. The resulting mark 242 can be detected by an optical sensor (e.g., optical pickup 157). Therefore, in another embodiment, the optical data or image recording and transmitting (i.e., reading) device includes additional parts used for optically transmitting data. It is to be understood that these other parts are in addition to the light source 150. One of the additional parts includes the previously mentioned sensor (e.g., optical pickup 157) positioned so as to detect at least one readable pattern of the optically detectable marks 242 on the imaging medium 100. Generally, the sensor reads at least one readable pattern as the imaging medium 100 moves in relation to the sensor. Another of the additional parts includes a processor 166. The processor 166 functions by receiving at least one signal (based on the at least one readable pattern detected by the sensor) sent by the sensor.

The color-forming agent 240 may be any substance that undergoes a detectable optical change in response to a threshold stimulus, which may be applied in the form of light or heat. In some embodiments, the color-forming agent 240 includes a leuco dye and a developer, as described in detail below. The developer and the leuco dye produce a detectable optical change when chemically mixed. The concentration and distribution of the color-forming components 240 in marking layer 230 are sufficient to produce a detectable mark 242 when activated.

In many embodiments, it may be desirable to provide a marking layer 230 that is equal to or less than one micron (μm) thick. In order to achieve this, spin coating is one suitable application technique. In addition, it may be desirable to provide a marking composition that is capable of forming a layer occupying the predetermined thickness (i.e., equal to or less than one micron (μm) thick). Thus, in such cases, the marking layer 230 should be, inter alia, free from particles that would prevent formation of such a layer, i.e., free from particles having a dimension greater than 1 μm. In some cases, the materials forming color or contrast are completely soluble in the marking composition solvent.

Furthermore, in many applications it may be desirable to provide a markable coating 230 that is transparent. In such a case, any particles present in the coating 230 would have an average size less than the wavelength of the light to which the coating is transparent. While a coating 230 in which all particles are smaller than 1 μm would serve this purpose, it may be more desirable to utilize a coating 230 in which the marking components are dissolved, as opposed to one in which they are present as particles. Still further, as target data densities increase, the dot size, or mark size, that can be used for data recording decreases. Some currently available technologies require an average dot size of 1 μm or less. For all of these reasons, marking layer 230 is therefore preferably, but not necessarily, entirely free of particles.

In some embodiments, both the developer and the leuco dye are soluble in the matrix 241. In other embodiments, one of the components may be suspended in the matrix 241 as distributed particles, but homogenous coatings may be preferred. The concentration and distribution of the color-forming agent 240 in marking layer 230 are sufficient to produce a detectable mark 242 when activated.

In embodiments where the color-forming agent 240 includes two components, such as the leuco dye and the developer, one of the components of the color-forming agent 240 may be provided in marking layer 230 as a precursor of the desired component. In these embodiments, the incident light or heat triggers a chemical change in the precursor, causing it to become the desired component. Once the desired component is formed, both components of the color-forming agent 240 will be present locally and the color-forming reaction occurs. Thus, if energy is applied to the desired region of marking layer 230, an optically detectable mark 242 can be produced.

In the present application, this may be accomplished by using a developer precursor in close proximity with the dye in the marking layer 230. It is believed that such a precursor is desirable to prevent the color-forming components 240 from combining prematurely and generating an optical change across the entire marking layer 230. The developer precursor does not become active as a developer until it has absorbed a stimulus which causes it to chemically rearrange. After this rearrangement, it can function as a developer as it comes in contact with the dye.

Depending on the color-forming agent 240 selected, the marking composition may become relatively more or relatively less absorbing at a desired wavelength upon activation. Because many commercial and consumer products use a single wavelength for both read and write operations, and because a color-forming agent 240 that produces a mark 242 that is relatively absorbing (relative to the unmarked regions) at the read wavelength is particularly advantageous, it is desirable to provide a color-forming agent 240 that produces a mark 242 that is relatively absorbing at the read/write wavelength.

By way of example, if blue-violet light (radiation) is to be used as the read radiation, the marks formed in the marking layer 230 are preferably a contrasting color, namely yellow to orange, indicating absorption of blue radiation. In certain embodiments, therefore, the marking composition contains a leuco dye that, when activated, changes from being relatively non-absorbing at blue-violet wavelengths to being relatively absorbing at those wavelengths.

Nonetheless, embodiments disclosed herein are not limited to such dyes. Specific examples of suitable leuco dyes include fluorans and phthalides, which include but are not limited to the following and which can be used alone or in combination: 1,2-benzo-6-(N-ethyl-N-toluidino)fluoran, 1,2-benzo-6-(N-methyl-N-cyclohexylamino)fluoran, 1,2-benzo-6-dibutylaminofluoran, 1,2-benzo-6-diethylaminofluran, 2-(.alpha.-phenylethylamino)-6-(N-ethyl-p-toluidino)fluoran, 2-(2,3-dichloroanilino)-3-chloro-6-diethylaminofluran, 2-(2,4-dimethylanilino)-3-methyl-6-diethylaminofluoran, 2-(di-p-methylbenzilamino)-6-(N-ethyl-p-toluidino)fluoran, 2-(m-trichloromethylanilino)-3-methyl-6-(N-cyclohexyl-N-methylamino)fluoran, 2-(m-trichloromethylanilino)-3-methyl-6-diethylanimofluoran, 2-(m-trifluoromethylaniline)-6-diethylaminofluoran, 2-(m-trifluoromethylanilino)-3-chloro-6-diethylaminofluran, 2-(m-trifluoromethylanilino)-3-methyl-6-diethylanimofluoran, 2-(N-ethyl-p-toluidino)-3-methyl-6-(N-ethylanilino) fluoran, 2-(N-ethyl-p-toluidino)-3-methyl-6-(N-propyl-p-toluidino) fluoran, 2-(o-chloroanilino)-3-chloro-6-diethlaminofluoran, 2-(o-chloroanilino)-6-dibutylaminofluoran, 2-(o-chloroanilino)-6-diethylaminofluoran, 2-(p-acetylanilino)-6-(N-n-amyl-N-n-butylamino)fluoran, 2,3-dimethyl-6-dimethylaminofluoran, 2-amino-6-(N-ethyl-2,4-dimethylanilino)fluoran, 2-amino-6-(N-ethylanilino)fluoran, 2-amino-6-(N-ethyl-p-chloroanilino)fluoran, 2-amino-6-(N-ethyl-p-ethylanilino)fluoran, 2-amino-6-(N-ethyl-p-toluidino)fluoran, 2-amino-6-(N-methyl-2,4-dimethylanilino)fluoran, 2-amino-6-(N-methylanilino)fluoran, 2-amino-6-(N-methyl-p-chloroanilino)fluoran, 2-amino-6-(N-methyl-p-ethylanilino)fluoran, 2-amino-6-(N-methyl-p-toluidino)fluoran, 2-amino-6-(N-propyl-2,4-dimethylanilino)fluoran, 2-amino-6-(N-propylanilino) fluoran, 2-amino-6-(N-propyl-p-chloroanilino)fluoran, 2-amino-6-(N-propyl-p-ethylanilino)fluoran, 2-amino-6-(N-propyl-p-toluidino)fluoran, 2-anilino-3-chloro-6-diethylaminofluran, 2-anilino-3-methyl-6-(N-cyclohexyl-N-methylamino)fluoran, 2-anilino-3-methyl-6-(N-ethyl-N-isoamylamino)fluoran, 2-anilino-3-methyl-6-(N-ethyl-N-p-benzyl)aminofluoran, 2-anilino-3-methyl-6-(N-ethyl-N-propylamino)fluoran, 2-anilino-3-methyl-6-(N-iso-amyl-N-ethylamino)fluoran, 2-anilino-3-methyl-6-(N-isobutyl-methyl amino)fluoran, 2-anilino-3-methyl-6-(N-isopropyl-methyl amino)fluoran, 2-anilino-3-methyl-6-(N-methyl-p-toluidino-)fluoran, 2-anilino-3-methyl-6-(N-n-amyl-N-ethylamino)fluoran, 2-anilino-3-methyl-6-(N-n-amyl-N-methylamino)fluoran, 2-anilino-3-methyl-6-(N-n-propyl-N-isopropylamino)fluoran, 2-anilino-3-methyl-6-(N-n-propyl-N-methylamino)fluoran, 2-anilino-3-methyl-6-(N-sec-butyl-N-methylamino)fluoran, 2-anilino-3-methyl-6-diethylaminofluoran, 2-anilino-3-methyl-6-di-n-butylaminofluoran, 2-anilino-6-(N-n-hexyl-N-ethylamino) fluoran, 2-benzilamino-6-(N-ethyl-2,4-dimethylanilino) fluoran, 2-benzilamino-6-(N-ethyl-p-toluidino)fluoran, 2-benzilamino-6-(N-methyl-2,4-dimethylanilino)fluoran, 2-benzilamino-6-(N-methyl-p-toluidino)fluoran, 2-bromo-6-diethylaminofluoran, 2-chloro-3-methyl-6-diethylaminofluran, 2-chloro-6-(N-ethyl-N-isoamylamino)fluoran, 2-chloro-6-diethylaminofluoran, 2-chloro-6-dipropylaminofluoran, 2-diethylamino-6-(N-ethyl-p-toluidino)fluoran, 2-diethylamino-6-(N-methyl-p-toluidino)fluoran, 2-dimethylamino-6-(N-ethylanilino)fluoran, 2-dimethylamino-6-(N-methylanilino)fluoran, 2-dipropylamino-6-(N-ethylanilino)fluoran, 2-dipropylamino-6-(N-methylanilino) fluoran, 2-ethylamino-6-(N-ethyl-2,4-dimethylanilino) fluoran, 2-ethylamino-6-(N-methyl-p-toluidino)fluoran, 2-methylamino-6-(N-ethylanilino)fluoran, 2-methylamino-6-(N-methyl-2,4-dimethylanilino)fluoran, 2-methylamino-6-(N-methylanilino)fluoran, 2-methylamino-6-(N-propylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3-(1-ethyl-2-methylindole-3-yl)-3-(2-ethoxy-4-diethylaminophenyl)-4-azaphthalide, 3-(N-cyclohexyl-N-methylamino)-6-methyl-7-phenylaminofluoran, 3-(N-ethyl-N-isoamylamino)-6-methyl-7-phenylaminofluoran, 3-(N-ethyl-p-toluidino)-6-methyl-7-phenylaminofluoran, 3,3-bis(2-ethoxy-4-diethylaminphenyl)-4-azaphthalide, 3,3-bis(2-ethoxy-4-diethylaminphenyl)-7-azaphthalide, 3,6-dibutoxyfluoran, 3,6-diethoxyfluoran, 3,6-dimethoxyfluoran, 3-bromo-6-cyclohexylaminofluoran, 3-chloro-6-cyclohexylaminofluoran, 3-dibutylamino-7-(o-chloro-phenylamino)fluoran, 3-diethylamino-5-methyl-7-dibenzylaminofluoran, 3-diethylamino-6-(m-trifluoromethylanilino)fluoran, 3-diethylamino-6,7-dimethylfuoran, 3-diethylamino-6-methyl-7-xylidinofluoran, 3-diethylamino-7-(2-carbomethoxy-phenylamino)fluoran, 3-diethylamino-7-(N-acetyl-N-methylamino)fluoran, 3-diethylamino-7-(N-chloroethyl-N-methylamino)fluoran, 3-diethylamino-7-(N-methyl-N-benzylamino)fluoran, 3-diethylamino-7-(o-chlorophenylamino)fluoran, 3-diethylamino-7-chlorofluoran, 3-diethylamino-7-dibenzylaminofluoran, 3-diethylamino-7-diethylaminofluoran, 3-diethylamino-7-N-methylaminofluoran, 3-dimethylamino-6-methoxylfluoran, 3-dimethylamino-7-methoxyfluoran, 3-methyl-6-(N-ethyl-p-toluidino)fluoran, 3-piperidino-6-methyl-7-phenylaminofluoran, 3-pyrrolidino-6-methyl-7-p-butylphenylaminofluoran, and 3-pyrrolidino-6-methyl-7-phenylaminofluoran.

Additional dyes that may be alloyed in accordance with the embodiments disclosed herein include, but are not limited to leuco dyes such as fluoran leuco dyes and phthalide color formers as are described in "The Chemistry and Applications of Leuco Dyes," Muthyala, Ramiah, ed., Plenum Press (1997) (ISBN 0-306-45459-9). Embodiments may include almost any known leuco dye, including, but not limited to, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methanes) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)-4,5-diphenylimidazoles, phenethylanilines, and mixtures thereof.

Particularly suitable leuco dyes include: 2'-Anilino-3'-methyl-6'-(dibutylamino)-fluoran:

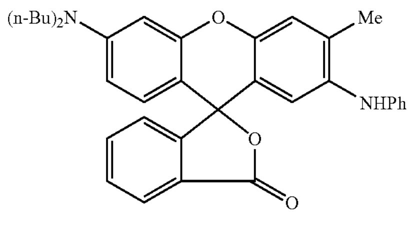

2-Anilino-3-methyl-6-(N-ethyl-N-isoamylamino) fluoran

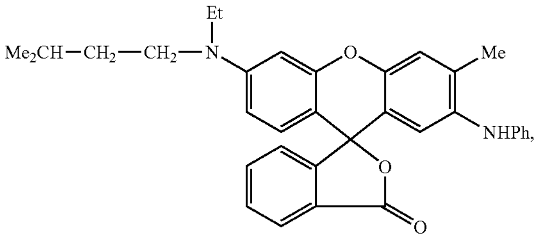

, and

2-Anilino-3-methyl-6-(di-n-amylamino)fluoran

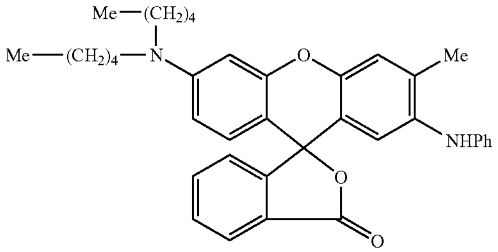

All three of the previously listed dyes are commercially available from Nagase Co of Japan. Additional examples of dyes include: Pink DCF CAS#29199-09-5; Orange-DCF, CAS#21934-68-9; Red-DCF CAS#26628-47-7; Vermilion-DCF, CAS#117342-26-4; Bis(dimethyl)aminobenzoyl phenothiazine, CAS#1249-97-4; Green-DCF, CAS#34372-72-0; chloroanilino dibutylaminofluoran, CAS#82137-81-3; NC-Yellow-3 CAS#36886-76-7; Copikem37, CAS#144190-25-0; Copikem3, CAS#22091-92-5, available from Hodogaya, Japan or Noveon, Cincinnati, USA.

Additional non-limiting examples of suitable fluoran-based leuco dyes include: 3-diethylamino-6-methyl-7-anilinofluoran 3-(N-ethyl-p-toluidino)-6-methyl-7-anilinofluoran, 3-(N-ethyl-N-isoamylamino)-6-methyl-7-anilinofluoran, 3-diethylamino-6-methyl-7-(o,p-dimethylanilino)fluorane, 3-pyrrolidino-6-methyl-7-anilinofluoran, 3-piperidino-6-methyl-7-anilinofluoran, 3-(N-cyclohexyl-N-methylamino)-6-methyl-7-anilinofluoran, 3-diethylamino-7-(m-trifluoromethylanilino) fluoran, 3-dibutylamino-6-methyl-7-anilinofluoran, 3-diethylamino-6-chloro-7-anilinofluoran, 3-dibutylamino-7-(o-chloroanilino)fluoran, 3-diethylamino-7-(o-chloroanilino)fluoran 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofluranone, 4,5,6,7-tetrachloro-3,3-bis[2-[4-(dimethylamino)phenyl]-2-(4-methoxyphenyl)ethenyl]fluoran, and mixtures thereof. Aminotriarylmethane leuco dyes may also be used herein, non-limiting examples of such dyes include tris(N,N-dimethylaminophenyl)methane (LCV); tris(N,N-diethylaminophenyl)methane (LECV); tris(N,N-di-n-propylaminophenyl)methane (LPCV); tris(N,N-din-butylaminophenyl) methane (LBCV); bis(4-diethylaminophenyl)-(4-diethylamino-2-methyl-phenyl)methane (LV-1); bis(4-diethylamino-2-methylphenyl)-(4-diethylamino-phenyl) methane (LV-2); tris(4-diethylamino-2-methylphenyl) methane (LV-3); bis(4-diethylamino-2-methylphenyl) (3,4-diemethoxyphenyl)methane (LB-8); aminotriarylmethane leuco dyes having different alkyl substituents bonded to the amino moieties wherein each alkyl group is independently selected from $C_1$-$C_4$ alkyl; and aminotriarylmethane leuco dyes with any of the preceding named structures that are further substituted with one or more alkyl groups on the aryl rings wherein the latter alkyl groups are independently selected from $C_1$-$C_3$ alkyl.

Any suitable developer may be used with these dyes. According to certain embodiments of the invention, the desired developer is provided in the form of a precursor that can be photochemically or photothermally modified to become the desired developer. As previously mentioned, by providing the developer in precursor form, the need to physically separate the developer from the dye is eliminated. For example, rather than providing one of the color-forming components 240 as particles that are suspended in the matrix 241, in some embodiments disclosed herein both the dye and the developer precursor are dissolved in the matrix 241.

Suitable developer precursors include, without limitation, phenyl esters that undergo a molecular rearrangement (e.g., an acyl shift) so as to become phenolic compounds capable of developing (activating) the leuco dye. Such rearrangements are sometimes referred to as Fries rearrangements. Fries rearrangements can be thermally driven, but it is to be understood that esters may also undergo photo-initiated Fries rearrangements (sometimes referred to as Photo Fries rearrangements). Both types of rearrangement are within the scope of the embodiments disclosed herein, and the stimulus for rearrangement may be light, heat, or a combination thereof.

In certain embodiments, suitable developer precursors include compounds (e.g., phenolic (aromatic hydroxyl) acyl derivatives) having the formula

ROCOR', where R is an aryl group and R' is an alkyl or aryl group. Exemplary compounds include, but are not limited to, di-O-acetylated and di-O-benzoylated curcuminoids. Alternatively, any aryl ester that absorbs or has a peak absorption wavelength ranging from about 380 nm to about 420 nm, and more particularly ranging from about 400 nm to about 410 nm may be a suitable developer precursor. Still other suitable developer precursors absorb or have a peak absorption wavelength selected from 405 nm, 650 nm, 780 nm, 984 nm and 1084 nm.

Still other suitable precursors include ester precursors of developers such as bisphenol-A, bisphenol-S, hydroxy benzyl benzoates, TG-SA (phenol, 4,4'-sulfonylbis[2-(2-propenyl)]) and poly-phenols.

As mentioned above, when the color-forming agent 240 includes a color former (such as in the case of a leuco dye) and a developer, the matrix 241 can be provided as a homogeneous, single-phase solution at ambient conditions because the use of a precursor for the developer prevents the color-forming reaction from occurring prior to activation. Nonetheless, in other embodiments, one or the other of the components may be substantially insoluble in the matrix 241 at ambient conditions. By "substantially insoluble," it is meant that the solubility of that component of the color-forming agent 240 in the matrix 241 at ambient conditions is so low, that no or very little color change occurs due to reaction of the dye and the developer at ambient conditions. Thus, in some embodiments, the developer is dissolved in the matrix 241 with the dye being present as small crystals suspended in the matrix 241 at ambient conditions; while in other embodiments, the color-former is dissolved in the matrix 241 and the developer is present as small crystals suspended in the matrix 241 at ambient conditions. In such embodiments, the particle size is generally less than 400 nm.

Laser light having blue, indigo, red and far-red wavelengths ranging from about 300 nm to about 980 nm may be used to develop the present color-forming compositions. Therefore, color-forming compositions may be selected for use in devices that emit wavelengths within this range. For example, if the light source 150 emits light having a wavelength of about 405 nm, the developer precursor may be selected to absorb and rearrange at or near that wavelength. In other embodiments, particularly those in which the developer precursor undergoes thermal rather than photochemical rearrangement, light sources 150 of other wavelengths, including but not limited to 650 nm or 780 nm, may be used. In either case, a radiation absorber tuned to the selected wavelength may be included so as to enhance localized heating.

In still other embodiments, the embodiments disclosed herein may be used with a radiation source such as a laser or LED that emits light having blue and indigo wavelengths ranging from about 380 nm to about 420 nm. In particular, radiation sources such as the lasers used in certain DVD and laser disk recording equipment emit energy at a wavelength of about 405 nm.

The matrix material may be any composition suitable for dissolving and/or dispersing the developer or developer precursor, and color-former (or color-former/melting aid alloy). Acceptable matrix materials include, but are not limited to, UV-curable matrices such as acrylate derivatives, oligomers and monomers, with or without a photo package. A photo package may include a light-absorbing species which initiates reactions for curing of a matrix 241, such as, by way of example, benzophenone derivatives. Other examples of photoinitiators for free radical polymerization monomers and pre-polymers include, but are not limited to, thioxanethone derivatives, anthraquinone derivatives, acetophenones and benzoine ether types. It may be desirable to choose a matrix 241 that can be cured by a form of radiation other than the type of radiation that causes a color change.

Matrices based on cationic polymerization resins may require photo-initiators based on aromatic diazonium salts, aromatic halonium salts, aromatic sulfonium salts and metallocene compounds. An example of an acceptable matrix 241 or matrices includes Nor-Cote CLCDG-1250A or Nor-Cote CDG000 (mixtures of UV curable acrylate monomers and oligomers), which contains a photoinitiator (hydroxy ketone) and organic solvent acrylates (e.g., methyl methacrylate, hexyl methacrylate, beta-phenoxy ethyl acrylate, and hexamethylene acrylate). Other acceptable matrixes or matrices include acrylated polyester oligomers such as CN292, CN293, CN294, SR351 (trimethylolpropane tri acrylate), SR395 (isodecyl acrylate), and SR256 (2(2-ethoxyethoxy) ethyl acrylate) available from Sartomer Co.

The photochemical and/or photothermal mechanisms that cause the present developer precursors to become developers are much slower when the solid matrix 241 is below its glass transition temperature ($T_g$). Without subscribing to a particular theory, the photochemical reactions in solids have an added energy barrier to heat the matrix 241 above its glass transition temperature $T_g$. Thus, in some embodiments, it is preferred to provide sufficient photothermal energy in the region of the desired mark to locally heat the matrix 241 above its glass transition temperature $T_g$. $T_g$ typically depends on the polymer composition of the matrix 241, and can be determined by selecting one or more desirable polymers for the matrix 241. In some embodiments, $T_g$ will preferably be in the range of about 120° C. to about 250° C.

The imaging compositions formed in the manner described herein can be applied to the surface of an imaging medium 100, such as a CD, DVD, HD-DVD, BLU-RAY disc or the like. Further, discs may be used in systems disclosed herein that include optical recording and/or reading capabilities. Such systems typically include a laser emitting light (e.g., light source 150) having a predetermined wavelength and power. Systems that include optical reading capability further include an optical pickup unit 157 coupled to the laser. Lasers and optical pickup units are known in the art.

Referring again to FIGS. 1 and 2, an exemplary read/write system 170 includes the processor 166, the laser 150, and the optical pickup 157. Signals 167 from processor 166 cause laser 150 to emit light at the desired power level. Light reflected 165 from the disc surface is detected by pickup 157, which in turn sends a corresponding signal 165 back to processor 166.

When it is desired to record, the imaging medium 100 is positioned such that light emitted by laser 150 is incident on the marking surface 230. The laser 150 is operated such that the light incident on the marking layer 230 transfers sufficient energy to the surface to cause a mark, such as 242. Both the laser 150 and the position of the imaging medium 100 are controlled by the processor 166, such that light is emitted by the laser 150 in pulses that form a pattern of marks 242 on the surface of the imaging medium 100.

When it is desired to read a pattern of marks 242 on the surface of an imaging medium 100, the imaging medium 100 is again positioned such that light emitted by laser 150 is incident on the marked surface. The laser 150 is operated such that the light incident at the surface does not transfer sufficient energy to the surface to cause a mark 242. Instead, the incident light is reflected from the marked surface to a greater or lesser degree, depending on the absence or presence of a mark 242. As the imaging medium 100 moves, changes in reflectance are recorded by optical pickup 157 which generates a signal 165 corresponding to the marked surface. Both the laser 150 and the position of the imaging medium 100 are controlled by the processor 166 during the reading process.

It will be understood that the read/write system 170 described herein is merely exemplary and includes components that are understood in the art. Various modifications can be made, including the use of multiple lasers, processors, and/or pickups and the use of light having different wavelengths. The read components may be separated from the write components, or may be combined in a single device. In some embodiments, imaging media 100 may be used with optical read/write equipment operating at wavelengths ranging between 380 nm and 420 nm.

While several embodiments have been described in detail, it will be apparent to those skilled in the art that the disclosed embodiments may be modified. Therefore, the foregoing description is to be considered exemplary rather than limiting.

What is claimed is:

1. A system for at least one of recording or transmitting optical data or visual images, comprising:

an optical data or visual image recording medium including:

a substrate; and a markable coating on the substrate, the markable coating including a leuco dye and a developer precursor, wherein the developer precursor includes a compound that undergoes rearrangement in response to a stimulus so as to become a developer that reacts with the leuco dye and wherein the developer precursor is selected from di-O-acetylated curcuminoids, di-O-benzoylated curcuminoids, and mixtures thereof; and at least one of a light or heat source positioned so as to at least one of illuminate or heat the recording medium in a predetermined manner to i) cause a photochemical or photothermal rearrangement of the developer precursor to form the developer which reacts with the leuco dye to form an optically detectable mark, or ii) cause at least one previously formed optically detectable mark on the markable coating to produce at least one readable pattern.

2. The system according to claim 1 wherein for optically transmitting data and visual images, the system further comprises:

a sensor positioned so as to detect the at least one readable pattern, the sensor reading the at least one readable pattern as the medium moves in relation to the sensor;

a processor to which the sensor sends at least one signal based on the at least one readable pattern detected by the sensor;

an analyzer to which the processor sends the at least one signal to analyze so that the at least one signal can be collected and stored as data; and a computer data base to which the analyzer sends the data from the at least one signal for collecting and storing and from which the data can be accessed.

3. A method for at least one of i) optically recording data or visual images, or ii) reading optically recorded data or visual images, the method comprising:

providing an optical data or visual image recording medium including a substrate coated with a markable coating, the markable coating including a leuco dye, and a developer precursor that undergoes chemical rearrangement in response to a stimulus so as to become a developer that reacts with the leuco dye and wherein the developer precursor is selected from the group consisting of di-O-acetylated curcuminoids, di-O-benzoylated curcuminoids, and mixtures thereof; and beaming at least one of light or heat from a source to i) cause the developer precursor to undergo rearrangement to become the developer and react with the leuco dye to form at least one optically detectable mark in the markable coating; or ii) cause at least one previously formed optically detectable mark on the markable coating to produce at least one readable pattern.

4. The method according to claim 3 wherein the at least one previously formed optically detectable mark produces the at least one readable pattern, and wherein the method further comprises:

detecting by a sensor the at least one readable pattern of the at least one previously formed optically detectable mark illuminated by the light on the medium, the sensor reading the at least one readable pattern as the medium moves in relation to the sensor; and sending from the sensor to a processor at least one signal based on the at least one readable pattern detected by the sensor.

5. A method of making an optical data recording medium, comprising:

establishing a markable coating on a substrate, the markable coating including a leuco dye, and a developer precursor including a compound that undergoes chemical rearrangement in response to a stimulus so as to become a developer that reacts with the leuco dye, wherein the developer precursor is selected from the group consisting of di-O-acetylated curcuminoids, di-O-benzoylated curcuminoids, and mixtures thereof; and forming an optically detectable mark in the markable coating using light having a predetermined wavelength, heat having a predetermined temperature, or combinations thereof.

6. The method according to claim 5 wherein prior to establishing the markable coating, the method further comprises dissolving both the leuco dye and the developer precursor in a matrix.

7. An optical recording medium, comprising:

a substrate; and a markable coating on the substrate, the markable coating including:

a matrix containing a color-forming agent comprising a leuco dye and a developer precursor;

wherein the developer precursor includes a compound that undergoes rearrangement in response to a stimulus so as to become a developer;

and wherein the developer precursor is selected from the group consisting of di-O-acetylated curcuminoids, di-O-benzoylated curcuminoids, and mixtures thereof.

* * * * *